(12) United States Patent
Ho et al.

(10) Patent No.: US 10,203,416 B2
(45) Date of Patent: Feb. 12, 2019

(54) POWER ADJUSTMENT FOR CODE SIGNALS

(71) Applicant: THE BOEING COMPANY, Chicago, IL (US)

(72) Inventors: Antony Ho, Chicago, IL (US); Robert A. Carey, Chicago, IL (US)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 15/158,280

(22) Filed: May 18, 2016

(65) Prior Publication Data

US 2017/0336514 A1 Nov. 23, 2017

(51) Int. Cl.
*G01S 19/34* (2010.01)
*G01S 19/32* (2010.01)
*G01S 19/02* (2010.01)

(52) U.S. Cl.
CPC ............. *G01S 19/34* (2013.01); *G01S 19/02* (2013.01); *G01S 19/32* (2013.01)

(58) Field of Classification Search
CPC ........... G01S 19/34; G01S 19/02; G01S 19/32
USPC .................................................. 342/357.74
See application file for complete search history.

(56) References Cited

U.S. PATENT DOCUMENTS

2009/0085739 A1 4/2009 Wei

FOREIGN PATENT DOCUMENTS

EP 2 942 889 11/2015

OTHER PUBLICATIONS

Tran et al., "Performance Evaluations of the New GPS L5 and L2 Civil (L2C) Signals," Journal of the Institute of Navigation, Dec. 1, 2004, pp. 199-212, vol. 51—No. 3, Institute of Navigation, Fairfax, Virgina/USA.
P.A. Dafesh, et al., "Phase-Optimized Constant-Envelope Transmission (POCET) Modulation Method for GNSS Signals", Aerospace, 22nd International Meeting of the Satellite Division of the Institute of Navigation, Savannah, GA, Sep. 22-25, 2009.

*Primary Examiner* — Harry K Liu
(74) *Attorney, Agent, or Firm* — Haynes and Boone, LLP

(57) ABSTRACT

Systems, methods, and apparatus for power adjustment for code signals are disclosed. In one or more embodiments, a disclosed method for adjusting power for code signals comprises determining, by at least one processor, a code loss for the transmission of the code signals by using a symbol table. The method further comprises determining, by at least one processor, an amount of change in attenuation for at least one adjustable attenuator on at least one vehicle by using the code loss. Further, the method comprises adjusting an attenuation, for at least one adjustable attenuator, by the amount of change in attenuation.

20 Claims, 10 Drawing Sheets

400 — $L_{CC} = P_{transmitted} - P_{desired}$

410 — $P_{desired} = \sum_{k=1}^{N} P_k$, where $P_k$ is the desired power in the $k^{th}$ code N is the number of codes. (e.g., N=5 when C/A, M, P, L1Cp, and L1Cd are combined)

420 — $P_{transmitted} = N * 2^N \left( \sum_{k=1}^{N} \frac{1}{\sqrt{P_k}} S_k \right)^{-1}, S_k = \sum_{j=1}^{2^N} B_k \begin{matrix} \cos\varnothing_j \\ \sin\varnothing_j \end{matrix}$ $B_k$ is the column vector of 1 or -1 in the symbol table for the $k^{th}$ code In the above $\begin{cases} \cos\varnothing_j \text{ is in effect when the } k^{th} \text{ code is assigned to the I channel} \\ \sin\varnothing_j \text{ is in effect when the } k^{th} \text{ code is assigned to the Q channel} \end{cases}$

| I-Channel | | Q-Channel | |
|---|---|---|---|
| $B_M$ | $B_{C/A}$ | $B_P$ | Phase ($\phi$) |
| 1 | 1 | 1 | -20.947 |
| 1 | 1 | -1 | 20.947 |
| 1 | -1 | 1 | 88.460 |
| 1 | -1 | -1 | -88.460 |
| -1 | 1 | 1 | 91.540 |
| -1 | 1 | -1 | -91.540 |
| -1 | -1 | 1 | 200.947 |
| -1 | -1 | -1 | -200.947 |

Table 510:

| $P_k$ (dBW) | -158 | -158.5 | -161.5 |
|---|---|---|---|
| $P_k$ (W) | 1.6E-16 | 1.4E-16 | 7.1E-17 |
| N | 3 | | |
| $P_{Desired}$ (dBW) | -154.312 | | |
| Code Loss (dB) | 2.680 | | |

FIG. 5B (520)

| $B_M *\cos(\phi)$ | $B_{C/A} *\cos(\phi)$ | $B_P *\sin(\phi)$ |
|---|---|---|
| 0.934 | 0.934 | -0.358 |
| 0.934 | 0.934 | -0.358 |
| 0.027 | -0.027 | 1.000 |
| 0.027 | -0.027 | 1.000 |
| 0.027 | -0.027 | 1.000 |
| 0.027 | -0.027 | 1.000 |
| 0.934 | 0.934 | -0.358 |
| 0.934 | 0.934 | -0.358 |

Table 530:

| $S_k$ | 3.843 | 3.628 | 2.569 |
|---|---|---|---|
| $S_k/\sqrt{P_k}$ | 3.05E+08 | 3.05E+08 | 3.05E+08 |
| $P_{Transmitted}$ (W) | 2.62E-08 | | |
| $P_{Transmitted}$ (dBW) | -151.632 | | |

|       | I-Channel |       | Q-Channel |         |         |              |
|-------|-----------|-------|-----------|---------|---------|--------------|
|       | $B_M$     | $B_{C/A}$ | $B_P$ | $B_{L1Cp}$ | $B_{L1Cd}$ | Phase ($\phi$) |
|       | 1 | 1 | 1 | 1 | 1 | 32.568 |
|       | 1 | 1 | 1 | 1 | -1 | 31.179 |
|       | 1 | 1 | 1 | -1 | 1 | -12.945 |
|       | 1 | 1 | 1 | -1 | -1 | -18.646 |
|       | 1 | 1 | -1 | 1 | 1 | 18.646 |
|       | 1 | 1 | -1 | 1 | -1 | 12.945 |
|       | 1 | 1 | -1 | -1 | 1 | -31.179 |
|       | 1 | 1 | -1 | -1 | -1 | -32.568 |
|       | 1 | -1 | 1 | 1 | 1 | 92.826 |
|       | 1 | -1 | 1 | 1 | -1 | 92.126 |
|       | 1 | -1 | 1 | -1 | 1 | 78.187 |
|       | 1 | -1 | 1 | -1 | -1 | -90.811 |
|       | 1 | -1 | -1 | 1 | 1 | 90.811 |
|       | 1 | -1 | -1 | 1 | -1 | -78.187 |
|       | 1 | -1 | -1 | -1 | 1 | -92.126 |
|       | 1 | -1 | -1 | -1 | -1 | -92.826 |
|       | -1 | 1 | 1 | 1 | 1 | 87.175 |
|       | -1 | 1 | 1 | 1 | -1 | 87.874 |
|       | -1 | 1 | 1 | -1 | 1 | 101.813 |
|       | -1 | 1 | 1 | -1 | -1 | -89.189 |
|       | -1 | 1 | -1 | 1 | 1 | 89.189 |
|       | -1 | 1 | -1 | 1 | -1 | -101.813 |
|       | -1 | 1 | -1 | -1 | 1 | -87.847 |
|       | -1 | 1 | -1 | -1 | -1 | -87.175 |
|       | -1 | -1 | 1 | 1 | 1 | 147.432 |
|       | -1 | -1 | 1 | 1 | -1 | 148.821 |
|       | -1 | -1 | 1 | -1 | 1 | 192.945 |
|       | -1 | -1 | 1 | -1 | -1 | -161.354 |
|       | -1 | -1 | -1 | 1 | 1 | 161.354 |
|       | -1 | -1 | -1 | 1 | -1 | -192.945 |
|       | -1 | -1 | -1 | -1 | 1 | -148.821 |
|       | -1 | -1 | -1 | -1 | -1 | -147.432 |

| $P_k$ (dBW) | -158 | -158.5 | -161.5 | -158.25 | -163 |
|-------------|------|--------|--------|---------|------|
| $P_k$ (W) | 1.6E-16 | 1.4E-16 | 7.1E-17 | 1.5E-16 | 5E-17 |
| N | 5 | | | | |
| $P_{Desired}$ (dBW) | -152.439 | | | | |
| Code Loss (dB) | 1.079 | | | | |

FIG. 6A

| $B_M$ *cos($\phi$) | $B_{C/A}$ *cos($\phi$) | $B_P$ *sin($\phi$) | $B_{LICp}$ *sin($\phi$) | $B_{LICd}$ *sin($\phi$) |
|---|---|---|---|---|
| 0.843 | 0.843 | 0.538 | 0.538 | 0.538 |
| 0.856 | 0.856 | 0.518 | 0.518 | -0.518 |
| 0.975 | 0.975 | -0.224 | 0.224 | -0.224 |
| 0.948 | 0.948 | -0.320 | 0.320 | 0.320 |
| 0.948 | 0.948 | -0.320 | 0.320 | 0.320 |
| 0.975 | 0.975 | -0.224 | 0.224 | -0.224 |
| 0.856 | 0.856 | 0.518 | 0.518 | -0.518 |
| 0.843 | 0.843 | 0.538 | 0.538 | 0.538 |
| -0.049 | 0.049 | 0.999 | 0.999 | 0.999 |
| -0.037 | 0.037 | 0.999 | 0.999 | -0.999 |
| 0.205 | -0.205 | 0.979 | -0.979 | 0.979 |
| -0.014 | 0.014 | -1.000 | 1.000 | 1.000 |
| -0.014 | 0.014 | -1.000 | 1.000 | 1.000 |
| 0.205 | -0.205 | 0.979 | -0.979 | 0.979 |
| -0.037 | 0.037 | 0.999 | 0.999 | -0.999 |
| -0.049 | 0.049 | 0.999 | 0.999 | 0.999 |
| -0.049 | 0.049 | 0.999 | 0.999 | 0.999 |
| -0.037 | 0.037 | 0.999 | 0.999 | -0.999 |
| 0.205 | -0.205 | 0.979 | -0.979 | 0.979 |
| -0.014 | 0.014 | -1.000 | 1.000 | 1.000 |
| -0.014 | 0.014 | -1.000 | 1.000 | 1.000 |
| 0.205 | -0.205 | 0.979 | -0.979 | 0.979 |
| -0.037 | 0.037 | 0.999 | 0.999 | -0.999 |
| -0.049 | 0.049 | 0.999 | 0.999 | 0.999 |
| 0.843 | 0.843 | 0.538 | 0.538 | 0.538 |
| 0.856 | 0.856 | 0.518 | 0.518 | -0.518 |
| 0.975 | 0.975 | -0.224 | 0.224 | -0.224 |
| 0.948 | 0.948 | -0.320 | 0.320 | 0.320 |
| 0.948 | 0.948 | -0.320 | 0.320 | 0.320 |
| 0.975 | 0.975 | -0.224 | 0.224 | -0.224 |
| 0.856 | 0.856 | 0.518 | 0.518 | -0.518 |
| 0.843 | 0.843 | 0.518 | 0.518 | -0.518 |

| | | | | | |
|---|---|---|---|---|---|
| $S_k$ | 14.898 | 14.065 | 9.957 | 14.476 | 8.378 |
| $S_k/\sqrt{P_k}$ | 1.18E+09 | 1.18E+09 | 1.18E+09 | 1.18E+09 | 1.18E+09 |
| $P_{Transmitted}$ (W) | 2.7E-08 | | | | |
| $P_{Transmitted}$ (dBW) | -151.360 | | | | |

*FIG. 6B*

| # of codes on L1 | signal combining | L1 Codes | CA | M | P | L1Cp | L1Cd | additional power needed for combining (dB) | powers | | |
|---|---|---|---|---|---|---|---|---|---|---|---|
| 1 code(s) | BPSK | Code Power (dBW) | -35.57 | | | | | 0.00 | -5.57 dBm | total xmit pwr | Min xmit pwr |
| 2 code(s) | QPSK | Code Power (dBW) | -35.57 | | -38.57 | | | 0.00 | -3.81 dBm | total xmit pwr | |
| 3 code(s) | Interplex | Code Power (dBW) | -35.57 | -35.07 | -38.57 | | | 2.68 | 1.30 dBm | total xmit pwr | |
| 4 code(s) | QISCET | Code Power (dBW) | -35.57 | | -38.57 | -35.32 | -40.07 | 0.71 | -0.21 dBm | total xmit pwr | Max xmit pwr |
| 5 code(s) | QISCET | Code Power (dBW) | -35.57 | -35.07 | -38.57 | -35.32 | -40.07 | 1.08 | 1.57 dBm | total xmit pwr | |
| 5 code(s) | QISCET | Code Power (dBW) | -35.57 | -28.07 | -38.57 | -35.32 | -40.07 | 1.26 | 5.00 dBm | total xmit pwr | |
| Nominal Code Power Ratios (referenced to C/A power) | | | 0.00 | 0.50 | -3.00 | 0.25 | -4.50 | | | | |

| # of codes on L2 | signal combining | L2 Codes | L2C | L2M | P | additional power needed for combining (dB) | powers | | |
|---|---|---|---|---|---|---|---|---|---|
| 1 code(s) | BPSK | Code Power (dBW) | -37.64 | | | 0.00 | -7.64 dBm | total xmit pwr | Min xmit pwr |
| 2 code(s) | QPSK | Code Power (dBW) | -37.64 | | -40.64 | 0.00 | -5.87 dBm | total xmit pwr | |
| 3 code(s) | Interplex | Code Power (dBW) | -37.64 | -37.14 | -40.64 | 2.68 | -0.77 dBm | total xmit pwr | Max xmit pwr |
| 3 code(s) | Interplex | Code Power (dBW) | -37.64 | -37.14 | -40.64 | 4.11 | 5.00 dBm | total xmit pwr | |
| Nominal Code Power Ratios (referenced to L2C power) | | | 0.00 | 0.50 | -3.00 | | | | |

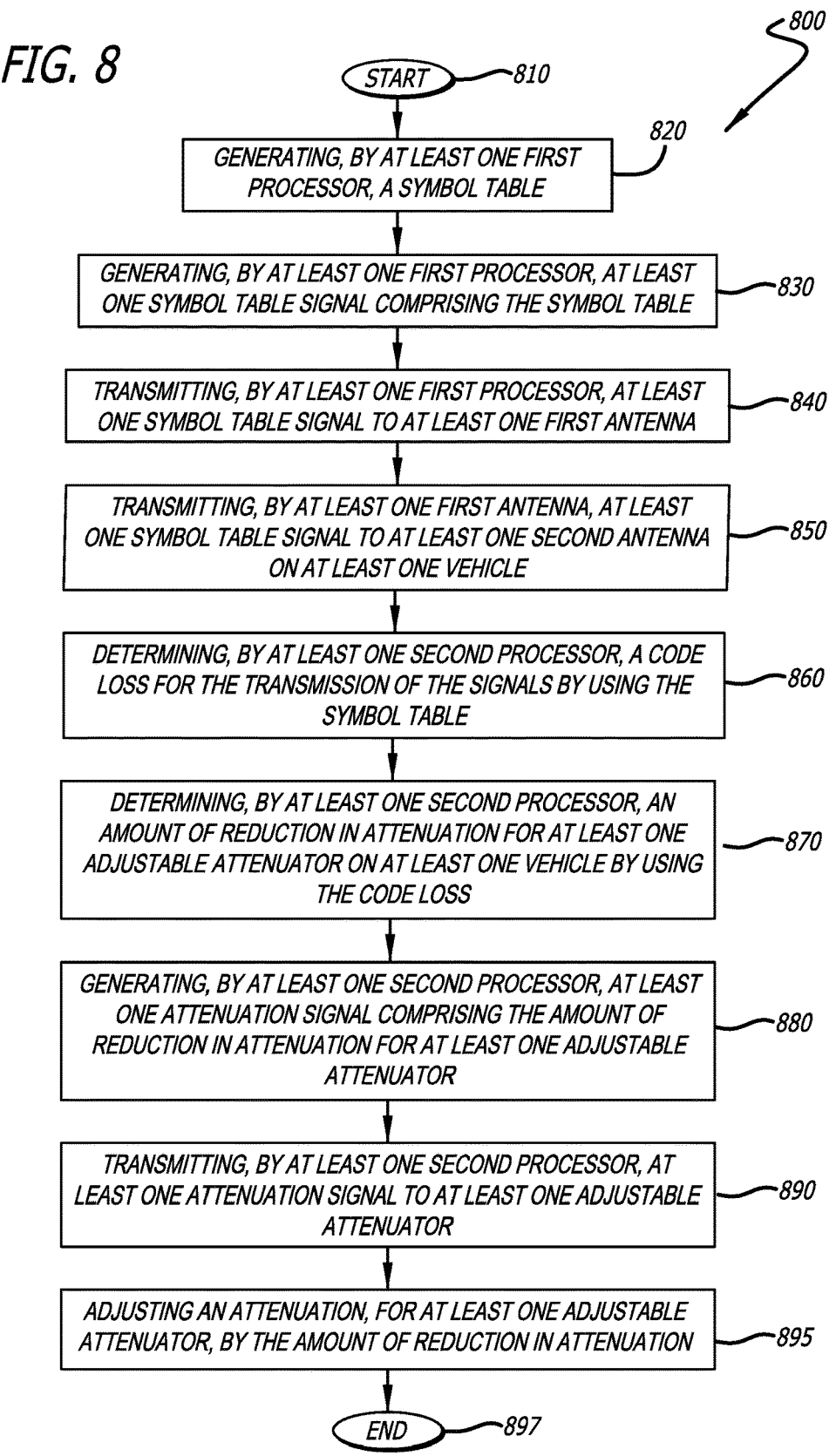

POWER ADJUSTMENT FOR CODE SIGNALS

FIELD

The present disclosure relates to power adjustment. In particular, it relates to power adjustment for code signals.

BACKGROUND

Code signals (e.g., Global Positioning System (GPS) signals) use different codes modulated on a carrier signal to increase the information throughput. Various code combining schemes utilizing code signals have been suggested that are easily implemented using a digital waveform generator (DWG), which typically operates at a fixed optimized output back-off level regardless of the code set. To accommodate reconfiguration due to adding or subtracting codes or boosting relative code powers, the gain following the DWG must be adjusted in concert with the redistribution of the code powers in the DWG. As such, the gain following the DWG needs to be adjusted when there is a change in code powers.

Existing solutions use an analog means of waveform generation and are limited to a small set of preselected code configurations. Digital waveform generation allows for an arbitrary combination of codes and code powers. The power range of a combined code set may exceed, for example with a GPS satellite, twenty-three (23) decibels (dB), or greater, as in the case of a single code versus five codes with a boost. However, the DWG is typically operated at an optimal back-off value with a corresponding fixed output power regardless of the code set. The primary reason for this mode of operation is the need to maintain the performance margin above the absolute quantization noise floor and the spurious product of the numerically controlled oscillator (NCO) design. Therefore, it becomes necessary to relegate the requisite gain adjustment to the amplification chain that follows the DWG. It may be possible to pre-compute and store a set of gain adjustment values on-board the vehicle; however, this method detracts from the inherent flexibility of the DWG, unless the table is large and unwieldy. As such, there is a need for improved power adjustment for code signals.

SUMMARY

The present disclosure relates to a method, system, and apparatus for power adjustment for code signals. In one or more embodiments, a method for adjusting power for code signals comprises determining, by at least one processor, a code loss for a transmission of the code signals by using a symbol table. The method further comprises determining, by at least one processor, an amount of change (e.g., reduction) in attenuation for at least one adjustable attenuator on at least one vehicle by using the code loss. Further, the method comprises adjusting an attenuation, for at least one adjustable attenuator, by the amount of change (e.g., reduction) in attenuation.

In one or more embodiments, the method further comprises generating (e.g., by another processor(s)) the symbol table by using at least one type of code, desired power for each of at least one type of code, and channel assignments for each of at least one type of code. Also, the method comprises generating (e.g., by another processor(s)) at least one symbol table signal comprising the symbol table. In addition, the method comprises transmitting (e.g., by another processor(s)) at least one symbol table signal to at least one first antenna. Additionally, the method comprises transmitting, by at least one first antenna, at least one symbol table signal to at least one second antenna on at least one vehicle.

In at least one embodiment, the method further comprises generating, by at least one processor, at least one attenuation signal comprising the amount of change (e.g., reduction) in attenuation for at least one adjustable attenuator. Also, the method comprises transmitting, by at least one processor, at least one attenuation signal to at least one adjustable attenuator. In some embodiments, the determining, by at least one processor, the amount of change (e.g., reduction) in attenuation for at least one adjustable attenuator further uses a reference code loss.

In one or more embodiments, at least one type of code is M-code, boosted M-code, C/A-code, P-code, L1Cp-code, L1Cd-code, and/or L2C-code. In some embodiments, the channel assignments for each of at least one type of code are in-phase (I) or quadrature (Q).

In at least one embodiment, at least one vehicle is an airborne vehicle, a terrestrial vehicle, and/or a marine vehicle. In one or more embodiments, at least one vehicle is at least one satellite. In some embodiments, at least one satellite is a global positioning system (GPS) satellite. In at least one embodiment, at least one processor is on at least one vehicle.

In one or more embodiments, a system for adjusting power for code signals, the system comprises at least one processor to determine a code loss for a transmission of the code signals by using a symbol table, and to determine an amount of change (e.g., reduction) in attenuation for at least one adjustable attenuator on at least one vehicle by using the code loss. The system further comprises at least one adjustable attenuator to adjust attenuation by the amount of change (e.g., reduction) in attenuation.

In at least one embodiment, the system further comprises at least one other processor to generate the symbol table by using at least one type of code, desired power for each of at least one type of code, and channel assignments for each of at least one type of code.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1A is a diagram showing an exemplary constellation envelope power for Codes A and B, where Codes A and B have equal powers, in accordance with at least one embodiment of the present disclosure.

FIG. 1B is a diagram showing an exemplary constellation envelope power for Codes A and B, where Code A is boosted in power relative to Code B, in accordance with at least one embodiment of the present disclosure.

FIG. 4 shows a plurality of formulas for computing the code combining loss (Lcc), in accordance with at least one embodiment of the present disclosure.

FIGS. 5A and 5B together show an exemplary symbol table for three codes as well as the computation for computing the associated code combining loss, in accordance with at least one embodiment of the present disclosure.

FIGS. 6A and 6B together show an exemplary symbol table for five codes as well as the computation for computing the associated code combining loss, in accordance with at least one embodiment of the present disclosure.

FIGS. 7A and 7B show exemplary tables showing the various different signal output powers for signals employing various different numbers of codes and different signal combining schemes, in accordance with at least one embodiment of the present disclosure.

FIG. 8 is a diagram showing a flow chart for the disclosed method for adjusting power for code signals, in accordance with at least one embodiment of the present disclosure.

Figure 9:
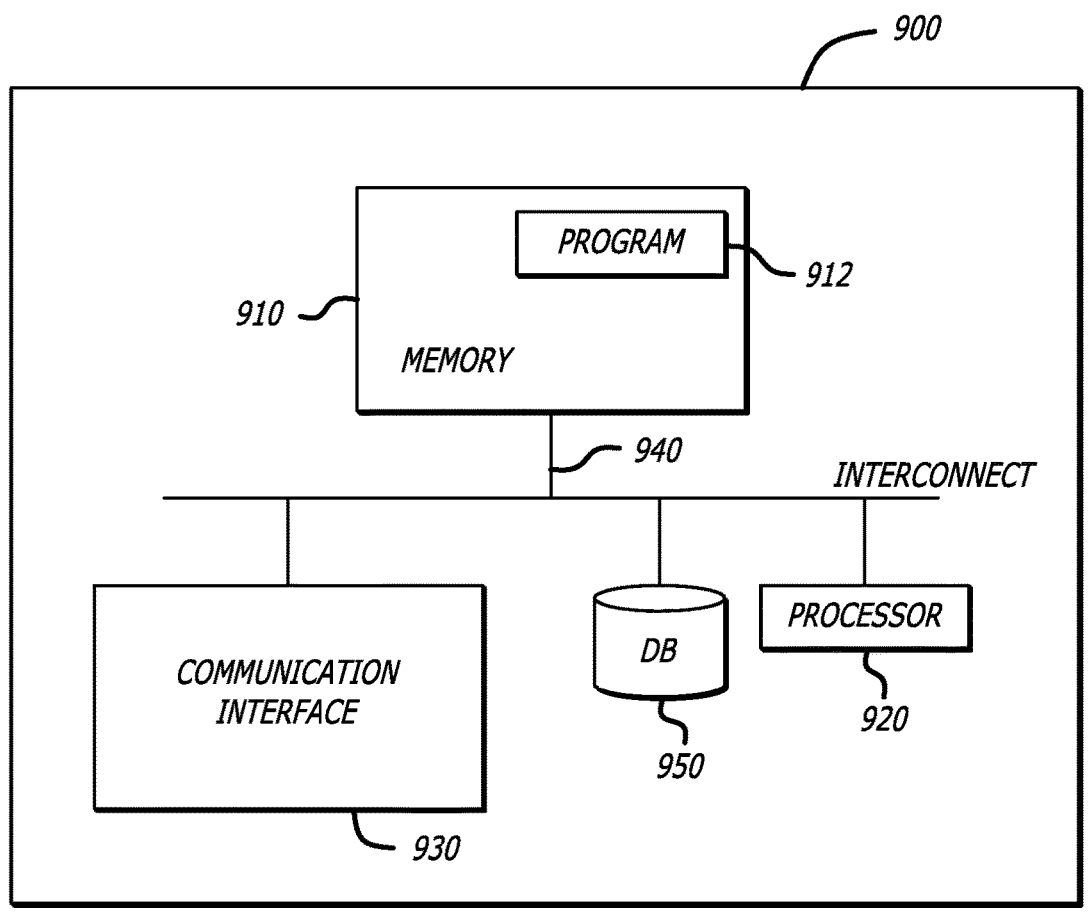

FIG. 9 is a block diagram of components of a computing apparatus or system in which various embodiments may be implemented or that may be utilized to execute embodiments.

DESCRIPTION

The methods and apparatus disclosed herein provide an operative system for adjusting power for code signals. The system of the present disclosure provides a necessary gain adjustment solution for code signals. The gain adjustment is computed using an uploaded symbol table, thereby providing flexibility for on-orbit reconfiguration of waveforms.

The disclosed system adjusts the gain on code signals (e.g., Global Positioning System (GPS) signals) by using a precalculated table (i.e. a symbol table) to accommodate a multiplexing of the codes. As previously mentioned above, code signals use different codes modulated on a carrier signal to increase the information throughput. Various code combining schemes utilizing code signals have been suggested that are easily implemented using a digital waveform generator (DWG), which typically operates at a fixed optimized output back-off level regardless of the code set. To accommodate reconfiguration due to adding or subtracting codes or boosting relative code powers, the gain following the DWG must be adjusted in concert with the redistribution of the code powers in the DWG. As such, the gain following the DWG needs to be adjusted when there is a change in code powers. The adjustment amount is a function of the code power distribution and the desired absolute levels. A symbol table is used to compute the appropriate adjustment in gain to accommodate the redistribution of codes.

The method of the present disclosure computes the gain adjustment from a symbol table, which is loaded into the DWG. Initially, the maximum gain in the amplification chain is associated with a reference symbol table corresponding to the expected maximum power distribution. Subsequently, an uploaded symbol table is processed and compared against the reference symbol table to generate an attenuation value to be applied to the amplification chain for obtaining the required absolute code powers at the subsystem output. The disclosed method provides the necessary gain adjustment value to realize the flexibility of the DWG for code power redistribution. Since only the symbol table is required to compute the gain adjustment, which by definition is uploaded into the DWG, the method enables the autonomous reconfiguration operation of the subsystem in a vehicle (e.g., a space vehicle).

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to communication and/or positioning systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1A:
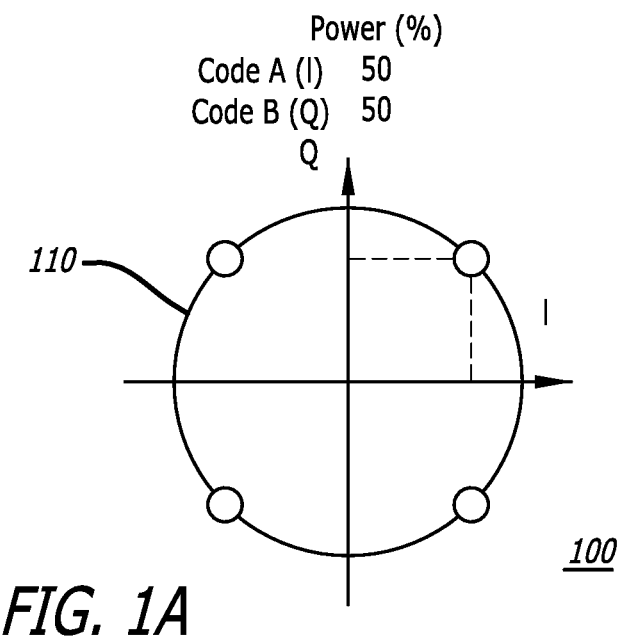
FIGS. 1A and 1B are diagrams illustrating exemplary constellation envelope powers for Codes A and B, in accordance with at least one embodiment of the present disclosure.
Figure 1B:
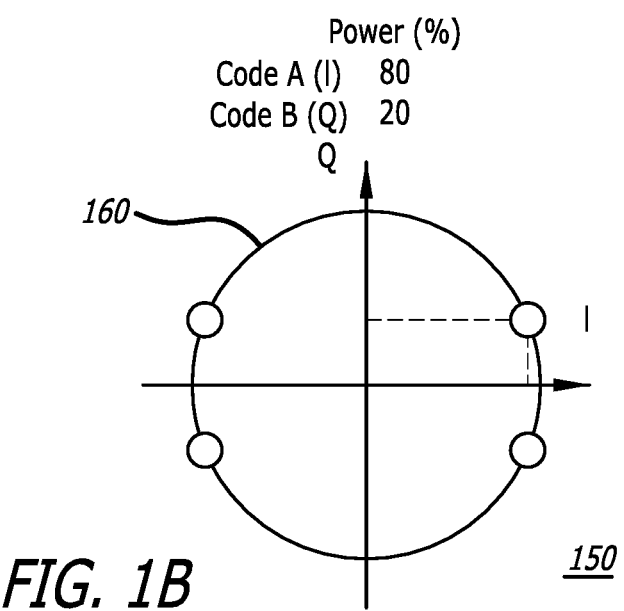

FIGS. 1A and 1B are diagrams illustrating exemplary constellation envelope powers for Codes A and B, in accordance with at least one embodiment of the present disclosure.

FIG. 1A is a diagram 100 showing an exemplary constellation envelope power 110 for Codes A and B, where Codes A and B have equal powers, in accordance with at least one embodiment of the present disclosure. In this figure, a graph is shown having a x-axis that plots the power of the in-phase (I) component of the signals and a y-axis that plots the power of the quadrature (Q) component of the signals. On the graph of FIG. 1A, Code A, which has an I channel assignment, is allocated fifty (50) percent (%) of the signal power, and Code B, which has a Q channel assignment, is allocated the remaining 50% of the signal power.

FIG. 1B is a diagram 150 showing an exemplary constellation envelope power 160 for Codes A and B, where Code A is boosted in power relative to Code B, in accordance with at least one embodiment of the present disclosure. Similar to FIG. 1A, FIG. 1B is a graph having a x-axis that plots the power of the I component of the signals and a y-axis that plots the power of the Q component of the signals. On the graph of FIG. 1B, Code A, which has an I channel assignment, is allocated eighty (80) % of the signal power, and Code B, which has a Q channel assignment, is allocated the remaining twenty (20) % of the signal power. It should be noted that when the power of Code A is boosted from 50% to 80%, as is shown in FIGS. 1A and 1B, the constellation envelope power 110, 160 does not change in size (i.e. the constellation envelope power 110, 160 is equal to the radius). As such, the amount of total signal power does not change.

Figure 2:
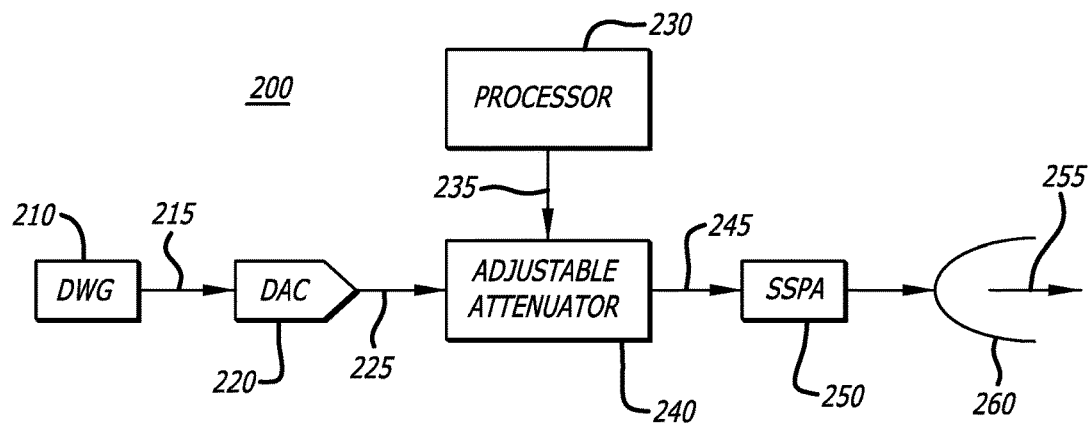
FIG. 2 is a diagram showing a navigation data processor (NDP) subsystem employed by the disclosed system for adjusting power for code signals, in accordance with at least one embodiment of the present disclosure.

FIG. 2 is a diagram showing a navigation data processor (NDP) subsystem 200 employed by the disclosed system for adjusting power for code signals, in accordance with at least one embodiment of the present disclosure. In this figure, the NDP subsystem 200 is shown to include a digital waveform generator (DWG) 210, a digital-to-analog converter (DAC) 220, a processor 230, an adjustable attenuator 240, a solid state power amplifier (SSPA) 250, and an antenna 260.

Figure 3:
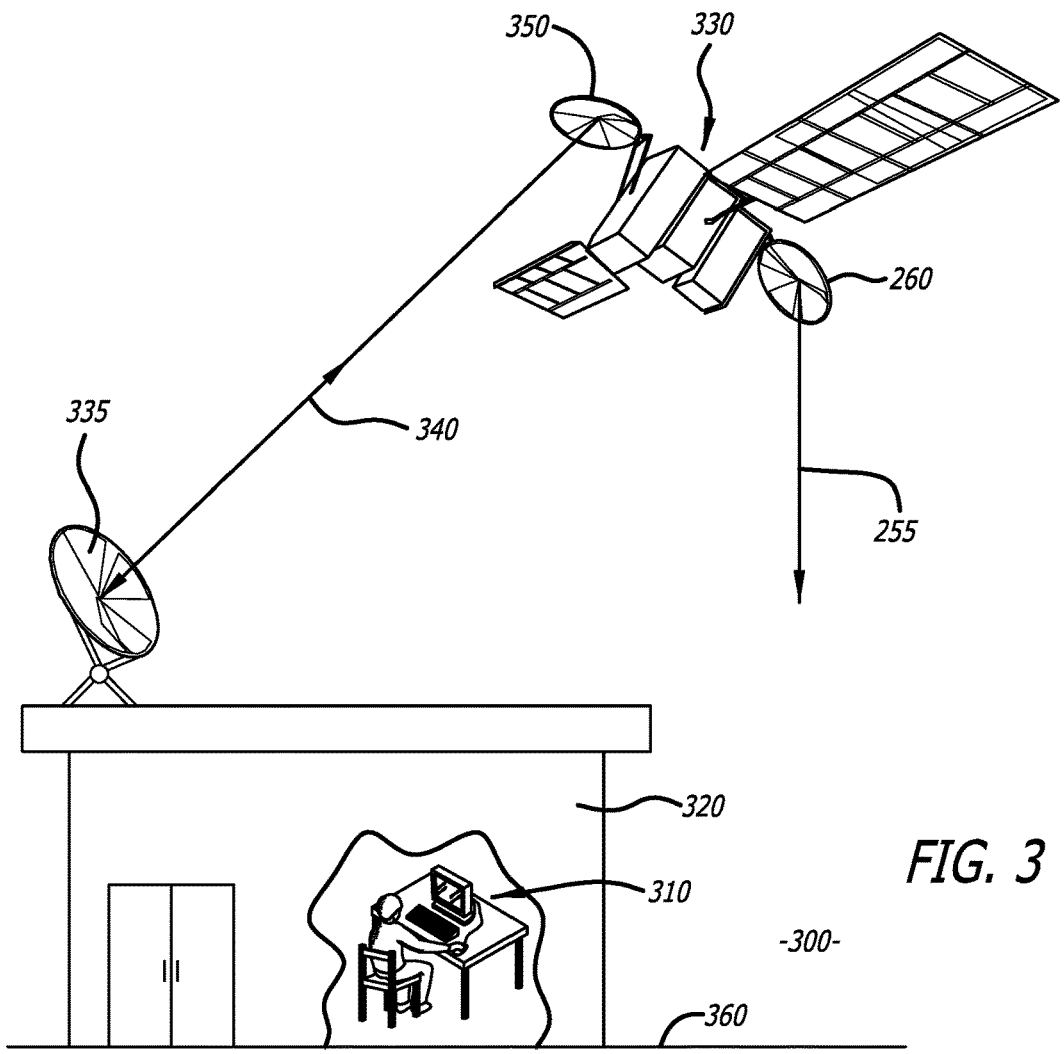
FIG. 3 is a diagram showing the disclosed system for adjusting power for code signals, in accordance with at least one embodiment of the present disclosure.

During operation, the DWG receives a symbol table (e.g., refer to 500 in FIG. 5 and 600 in FIG. 6) from a processor 310 (e.g., refer to FIG. 3) at a ground station 320 (e.g., refer to FIG. 3). The DWG 210 uses the symbol table as instructions to generate the appropriate digital waveforms 215 for the signals (i.e. code signals) 255 to be transmitted by the vehicle 330 (e.g., refer to FIG. 3). The DWG 210 then transmits the generated digital waveforms 215 to the DAC 220. The DAC 220 converts the digital waveforms 215 to analog signals 225.

The processor 230, which may comprise more than one processor 230, uses the symbol table to determine the code combining loss (Lcc) (also referred to simply as the code loss) for the signals (i.e. code signals) 255 to be transmitted by the vehicle (details regarding the computation of the Lcc are discussed in the discussion of FIGS. 4-6B). The processor 230 then uses the Lcc (i.e. by comparing the Lcc to a reference Lcc) to determine an amount of reduction (e.g., in dB) in attenuation to adjust the adjustable attenuator 240. It should be noted that the adjustable attenuator 240 may comprise more than one adjustable attenuator 240. The processor 230 then generates at least one attenuation signal 235 that comprises the amount of reduction in attenuation to adjust the adjustable attenuator 240. Then, the processor 230 transmits the attenuation signal(s) 235 to the adjustable attenuator 240.

The adjustable attenuator 240 then adjusts its amount of attenuation according to the amount of reduction in attenuation specified in the attenuation signal(s) 235. The DAC 220 transmits the analog signals 225 to the adjustable attenuator 240. The adjustable attenuator 240 then transmits adjusted analog signals 245 to the SSPA 250. The SSPA 250 amplifies the adjusted analog signals 245 to produce the signals (i.e. code signals) 255 to be transmitted by the vehicle. An antenna 260, which may comprise more than one antenna, then radiates and transmits the signals (i.e. code signals) 255.

It should be noted that the NDP subsystem 200 is housed on a vehicle 330 (e.g., refer to FIG. 3). Various different types of vehicles may be employed for the disclosed system for adjusting power for code signals including, but not limited to, various different types of satellites (e.g., low earth orbiting (LEO) satellites, medium earth orbiting (MEO) satellites (such as GPS satellites), highly elliptical orbit (HEO) satellites, and geosynchronous earth orbiting (GEO) satellites), various different types of airborne vehicles (e.g., aircraft and UAVs), various different types of terrestrial vehicles (e.g., tanks), and various different types of marine vehicles (e.g., ships).

FIG. 3 is a diagram 300 showing the disclosed system for adjusting power for code signals, in accordance with at least one embodiment of the present disclosure. In this figure, a ground station 320 on Earth 360 is shown to comprise a processor 310, which may comprise more than one processor. Also, in this figure, a vehicle (which is a satellite) 330 is shown to comprise an antenna 350.

During operation of the disclosed system, the processor 310 generates a symbol table (e.g., refer to 500 in FIG. 5 and 600 in FIG. 6) by using at least one type of code (e.g., M-code, boosted M-code, C/A-code, P-code, L1Cp-code, L1Cd-code, and L2C-code) for the signals (i.e. code signals) 255 to be transmitted by the vehicle 330), desired power for each of at least one type of code, and channel assignments (e.g., in-phase (I) or quadrature (Q)) for each of at least one type of code. The processor 310 then generates at least one symbol table signal 340 comprising the symbol table. Then, the processor 310 transmits the symbol table signal(s) 340 to an antenna 335, which may comprise more than one antenna 335, associated with the ground station 320. The antenna 335 then transmits the symbol table signal(s) 340 to an antenna 350, which may comprise more than one antenna 350, on the vehicle 330. It should be noted that in some embodiments, the symbol table may be generated by a processor (e.g., processor 230 in FIG. 2) on the vehicle 330 instead of being generated by a processor (e.g., processor 310 of FIG. 3) on the ground.

On board the vehicle 330, the NDP subsystem 200 (refer to FIG. 2) uses the symbol table to generate the signals (i.e. code signals) 255 to be transmitted by the vehicle 330 (refer to the description of FIG. 2 for details regarding this process). Then, the antenna 260 transmits and radiates the generated signals (i.e. code signals) 255.

FIG. 4 shows a plurality of formulas for computing the code combining loss (Lcc), in accordance with at least one embodiment of the present disclosure. In this figure, formula 400 shows that Lcc is equal to the desired power for the signals transmitted by the vehicle ($P_{desired}$) minus the actual transmitted power for the signals transmitted by the vehicle ($P_{transmitted}$). Formula 410 shows that $P_{desired}$ is the summation of $P_k$, where $P_k$ is the desired power is the $k^{th}$ code of the signals. Formula 420 shows the formulas for calculating $S_k$ and $P_{transmitted}$; where N is the number of codes, $B_k$ is the column vector of 1 or −1 in the symbol table for the $k^{th}$ code, $\cos \phi_j$ is in effect when the $k^{th}$ code is assigned to the I channel, and $\sin \phi_j$ is in effect when the $k^{th}$ code is assigned to the Q channel.

FIGS. 5A and 5B show an exemplary symbol table 500 for three codes (i.e. M-code, C/A-code, and P-code) as well as the computation tables 510, 520, 530 for computing the associated code combining loss 540, in accordance with at least one embodiment of the present disclosure. FIGS. 5A and 5B are, for example, for the L1-channel for a GPS satellite. In FIG. 5A, the symbol table 500 is shown to include four columns, which are for the symbols for the M-code (which is assigned to the I channel), the symbols for the C/A-code (which is assigned to the I channel), the symbols for the P-code (which is assigned to the Q channel), and the associated phase ($\phi$) for each respective row of symbols.

In FIG. 5A, the table 510 shows the desired powers ($P_k$) in decibel Watts (dbW) 550 for each of the three codes, respectively. These desired powers ($P_k$) 550 for each of the codes are typically chosen by the customer. The table 510 also shows the desired powers ($P_k$) converted into in Watts (W) 555. Also in the table 510, N 565 is shown to be equal to 3 codes. The total code power ($P_{desired}$) (dbW) 560 is computed by multiplying 10 times the log of the sum of the desired powers ($P_k$) in Watts (W) 555 (e.g., $P_{desired}$ (dbW)=10*Log 10(1.6E−16+1.4E−16+7.1E−17).

In FIG. 5B, table 520 shows entries equaling the symbol (taken from the symbol table 500) multiplied by the cosine of the phase ($\phi$) (taken from the symbol table 500) for each of the symbols in the symbol table 500. For example, in table 520, the first entry 570 is equal to (1)*cos(−20.947)=0.934 (i.e. the first entry 570 is equal to $B_M$*cos($\phi$)).

In FIG. 5B, table 530 shows $S_k$ 580, which is simply the sum of each of the columns of the table 520. Table 530 also shows $S_k$ divided by the square root of $P_k$ (i.e. $S_k$/sqrt($P_k$)) 590 (e.g., $S_k$/sqrt($P_k$)=3.843/sqrt(1.6E−16)=3.05E8). Also, table 530 shows the calculation of $P_{transmitted}$ (W) 595, which is equal to N times 2 to the N power divided by the sum of $S_k$ divided by the square root of $P_k$ (e.g., $P_{transmitted}$ 595=3*$2^3$/(3.05E8+3.05E8+3.05E8)). Table 530 also shows $P_{transmitted}$ converted into in dBW 597.

In FIG. 5A, table 510 shows the code loss (Lcc) 540 is equal to $P_{transmitted}$ (dBW) 597 minus ($P_{desired}$) (dbW) 560 (i.e. Lcc 540=$P_{transmitted}$ (dBW) 597−($P_{desired}$) (dbW) 560) (e.g., 2.680=−151.632−(−154.312)).

FIGS. 6A and 6B show an exemplary symbol table 600 for five codes (i.e. M-code, C/A-code, P-code, L1Cp-code, and L1Cd-code) as well as the computation tables 610, 620, 630 for computing the associated code combining loss 640, in accordance with at least one embodiment of the present disclosure. FIGS. 6A and 6B are, for example, for the L1-channel for a GPS satellite. The computation in the computation tables 610, 620, 630 in FIGS. 6A and 6B follows similarly the computation in the computation tables 510, 520, 530 of FIGS. 5A and 5B.

FIGS. 7A and 7B show exemplary tables 700, 710 showing the various different signal output powers for signals employing various different numbers of codes and different signal combining schemes, in accordance with at least one embodiment of the present disclosure. In particular, FIG. 7A shows an exemplary table 700 showing the various different signal output powers for signals on the L1 GPS channels, and FIG. 7B shows an exemplary table 710 showing the various different signal output powers for signals on the L2 GPS channels.

The Tables 700, 710 in these figures are presented to describe how a reference Lcc is determined. In order to determine the reference Lcc for a specific channel (e.g., L1 channel or L2 channel), a table 700, 710 is produced for various different code combinations for that channel. For example, for the table 700 of FIG. 7A, for the L1 channel, various different code configurations comprising various different numbers of codes (e.g., N=1, 2, 3, 4, or 5) with different signal combining methods (e.g., binary phase shift key (BPSK), quadrature phase shift key (QPSK), Interplex, and QISCET) along with various different power levels for the codes in dBW are compared with one another. The code configuration with the highest total transmit (xmit) power (pwr) in decibel-milliwatts (dBm) will be chosen to be the reference code configuration. As such, in FIG. 7A, the code configuration of the last row with a total transmit power of 5.0 dBm will be used as the reference code configuration, and in FIG. 7B, the code configuration of the last row with a total transmit power of 5.0 dBm will be used as the reference code configuration.

Once the reference code configuration is chosen, the Lcc for that particular reference code configuration will be calculated, and that Lcc will be designated as the reference Lcc. Then, the reference Lcc will be subtracted from the calculated Lcc to determine the amount of reduction (e.g., in dB) in attenuation to adjust the adjustable attenuator 240 (refer to FIG. 2). For example, for the L1 channel shown in table 700 of FIG. 7A, the chosen reference code configuration is shown to have a Lcc of 1.26 dB. Also, for example, the table 510 of FIG. 5A for the L1-channel is shown to have calculated the Lcc to be equal to 2.68. As such, the amount of reduction in attenuation to adjust the adjustable attenuator 240 will be equal to the Lcc minus the reference Lcc (i.e. 2.68−1.26=1.42 dB). Then, the adjustable attenuator 240 will be adjusted to have a reduction in attenuation of 1.42 dB.

FIG. 8 is a diagram showing a flow chart for the disclosed method 800 for adjusting power for code signals, in accordance with at least one embodiment of the present disclosure. At the start 810 of the method 800, at least one first processor generates a symbol table by using at least one type of code, desired power for each of at least one type of code, and channel assignments for each of at least one type of code 820. At least one processor then generates at least one symbol table signal comprising the symbol table 830. At least one first processor then transmits at least one symbol table signal to at least one first antenna 840. Then, at least one first antenna transmits at least one symbol table signal to at least one second antenna on at least one vehicle 850. At least one second processor determines a code loss (i.e. the code combining loss (Lcc)) for the transmission of the signals (i.e. the code signals) by using the symbol table 860. At least one second processor then determines an amount of reduction in attenuation for at least one adjustable attenuator on at least one vehicle by using the code loss 870. At least one one second processor then generates at least one attenuation signal comprising an amount of reduction in attenuation for at least one adjustable attenuator 880. Then, at least one second processor transmits at least one attenuation signal to at least one adjustable attenuator 890. At least one adjustable attenuator adjusts its attenuation by the amount of reduction in attenuation 895. Then, the method 800 ends 897.

FIG. 9 is a block diagram of components of a computing apparatus or system in which various embodiments may be implemented or that may be utilized to execute embodiments. FIG. 9 generally illustrates components of a computing device 900 (e.g., processor 230 of FIG. 2 and/or processor 310 of FIG. 3) that may be utilized to execute embodiments and that includes a memory 910, a program (e.g., attenuation calculation application instructions) 912, a processor or controller 920 to execute the program 912, a database 950 for storing data (e.g., for storing the symbol table and for storing the Lcc computations along with the Lcc), a network interface 930, e.g., for communications with a network or interconnect 940 between such components. The memory 910 may be or include one or more of cache, RAM, ROM, SRAM, DRAM, RDRAM, EEPROM and other types of volatile or non-volatile memory capable of storing data. The processor unit 920 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 940 may include a system bus, LDT, PCI, ISA, or other types of buses, and the communications or network interface may, for example, be an Ethernet interface, a Frame Relay interface, or other interface. The network interface 930 may be configured to enable a system component to communicate with other system components across a network that may be a wireless or various other networks. It should be noted that one or more components of computing device 900 may be located remotely and accessed via a network. Accordingly, the system configuration provided in FIG. 9 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 920 executes program instructions 912 within memory 910 and/or embodied on the carrier to implement method embodiments. Further, embodiments may reside and/or execute on a vehicle, such as a satellite (e.g. a GPS satellite).

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

As a further example, embodiments may involve an application or algorithm (e.g., a attenuation calculation program(s)), which may be run on a processor(s) (e.g., processor 230 and/or 310). The application or algorithm may be a stand alone application, which may contain one or more programs, or that is part of another system or program.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for adjusting power for code signals, the method comprising:
    generating, by at least one processor associated with a ground station, a symbol table by using at least one type of code, desired power for each of the at least one type of code, and channel assignments for each of the at least one type of code;
    transmitting, by at least one antenna associated with the ground station, to at least one receive antenna on a vehicle at least one symbol table signal comprising the symbol table;
    determining, by at least one processor on the vehicle, a code loss for a transmission of the code signals by using the symbol table;
    determining, by the at least one processor on the vehicle, an amount of change in attenuation for at least one adjustable attenuator on the vehicle by using the code loss;
    adjusting an attenuation, for the at least one adjustable attenuator, by the amount of change in attenuation;
    attenuating, by the at least one adjustable attenuator, signals to generate adjusted signals;
    amplifying, by at least one amplifier on the vehicle, the adjusted signals to generate the code signals; and
    transmitting, by at least one transmit antenna on the vehicle, the code signals.

2. The method of claim 1, wherein the method further comprises generating, by the at least one processor associated with the ground station, the at least one symbol table signal comprising the symbol table.

3. The method of claim 2, wherein the method further comprises transmitting, by the at least one processor associated with the ground station, the at least one symbol table signal to the at least one antenna associated with the ground station.

4. The method of claim 3, wherein the method further comprises receiving, by the at least one receive antenna on the vehicle, the at least one symbol table signal.

5. The method of claim 1, wherein the method further comprises generating, by the at least one processor on the vehicle, at least one attenuation signal comprising the amount of change in attenuation for the at least one adjustable attenuator.

6. The method of claim 5, wherein the method further comprises transmitting, by the at least one processor on the vehicle, the at least one attenuation signal to the at least one adjustable attenuator.

7. The method of claim 1, wherein the determining, by the at least one processor on the vehicle, the amount of change in attenuation for the at least one adjustable attenuator further uses a reference code loss.

8. The method of claim 1, wherein the at least one type of code is at least one of M-code, boosted M-code, C/A-code, P-code, L1Cp-code, L1Cd-code, or L2C-code.

9. The method of claim 1, wherein the channel assignments for each of the at least one type of code are one of in-phase (I) or quadrature (Q).

10. The method of claim 1, wherein the vehicle is one of an airborne vehicle, a terrestrial vehicle, or a marine vehicle.

11. The method of claim 10, wherein the vehicle is a satellite.

12. The method of claim 11, wherein the satellite is a global positioning system (GPS) satellite.

13. A system for adjusting power for code signals, the system comprising:
    at least one processor associated with a ground station to generate a symbol table by using at least one type of code, desired power for each of the at least one type of code, and channel assignments for each of the at least one type of code;
    at least one antenna associated with the ground station to transmit to at least one receive antenna on a vehicle at least one symbol table signal comprising the symbol table;

at least one processor on the vehicle to determine a code loss for a transmission of the code signals by using the symbol table, and to determine an amount of change in attenuation for at least one adjustable attenuator on the vehicle by using the code loss;

the at least one adjustable attenuator on the vehicle to adjust attenuation by the amount of change in attenuation, and to attenuate signals to generate adjusted signals;

at least one amplifier on the vehicle to amplify the adjusted signals to generate the code signals; and at least one transmit antenna on the vehicle to transmit the code signals.

14. The system of claim 13, wherein the at least one type of code is at least one of M-code, boosted M-code, C/A-code, P-code, L1Cp-code, L1Cd-code, or L2C-code.

15. The system of claim 13, wherein the channel assignments for each of the at least one type of code are one of in-phase (I) or quadrature (Q).

16. The system of claim 13, wherein the vehicle is one of an airborne vehicle, a terrestrial vehicle, or a marine vehicle.

17. The system of claim 16, wherein the vehicle is a satellite.

18. The system of claim 17, wherein the satellite is a global positioning system (GPS) satellite.

19. The system of claim 13, wherein the at least one processor associated with the ground station is further to generate the at least one symbol table signal comprising the symbol table.

20. The system of claim 19, wherein the at least one processor associated with the ground station is further to transmit the at least one symbol table signal to the at least one antenna associated with the ground station.

* * * * *